United States Patent [19]
Binford

[11] Patent Number: 5,450,783
[45] Date of Patent: Sep. 19, 1995

[54] LOW EMISSION PISTON RING

[75] Inventor: J. Dudley Binford, Richmond, Ind.

[73] Assignee: Dana Corporation, Toledo, Ohio

[21] Appl. No.: 209,156

[22] Filed: Mar. 10, 1994

[51] Int. Cl.⁶ ............................................... F16J 1/04
[52] U.S. Cl. ..................... 92/208; 277/206 A; 277/216; 277/217; 123/193.6
[58] Field of Search ................. 92/208, 192; 277/216, 277/217, 139, 206 A; 123/193.6

[56] References Cited

U.S. PATENT DOCUMENTS

| 2,003,764 | 6/1935 | Welch . | |
|---|---|---|---|
| 2,012,956 | 9/1935 | Chaffin . | |
| 2,074,581 | 3/1937 | Frye . | |
| 2,228,495 | 1/1941 | Williams . | |
| 2,296,116 | 5/1941 | Pelc . | |
| 3,047,301 | 7/1962 | Taylor et al. | 277/206 A |
| 3,198,531 | 8/1965 | Brenneke . | |
| 3,600,045 | 7/1971 | Inoue . | |
| 3,704,893 | 12/1972 | Hill . | |
| 3,742,823 | 7/1973 | Fiedler . | |
| 4,877,257 | 10/1989 | Ide | 123/193.6 |

FOREIGN PATENT DOCUMENTS

| 1549562 | 12/1968 | France | 277/206 A |
|---|---|---|---|
| 3446691 | 4/1986 | Germany | 277/216 |
| 1539358 | 1/1990 | U.S.S.R. | 277/216 |

Primary Examiner—Thomas E. Denion
Attorney, Agent, or Firm—Dykema Gossett

[57] ABSTRACT

A piston assembly such as that used with an internal combustion engine includes an annular cylinder having an inner cylinder wall defining a bore. An annular piston is reciprocal along a longitudinally extending axis within the bore of the cylinder. The piston includes two grooves that define the angled walls of a generally keystone wedge. A single strip of metal is formed into a one-piece split annular top land type piston ring with little or no intrinsic load. The piston ring is adapted to be received within the grooves of the piston to provide sealing engagement between the piston and the cylinder wall. The shape of the piston ring and the wedge of the piston provide a smooth sliding movement between the mating components as a dynamic force component is created in a radial direction in response to piston reciprocation along the longitudinal axis of the cylinder.

17 Claims, 2 Drawing Sheets

LOW EMISSION PISTON RING

FIELD OF THE INVENTION

The present invention relates to a piston ring for use in an internal combustion engine, and more particularly to a piston ring for reducing emission of pollutants that has an upper surface exposed to combustion gases.

BACKGROUND OF THE INVENTION

Piston rings are well known. They are usually received within an annular groove disposed about an outer periphery of a piston. In turn, the piston is reciprocable within a cylinder. A piston compresses fluids such as gases within the cylinder. In an internal combustion engine, these fluids are ignited, and expand, forcing the piston away from the point of ignition. Not all of the fluids are ignited, however. Instead, some of the fluids are typically trapped in a crevice defined between an outer radial surface of the piston and the relatively cool cylinder wall, and between the top piston ring and the top of the piston. The trapping of fluids within the crevice lowers combustion efficiency because the trapped fluids do not ignite. Further, when exhausted from the assembly, the trapped fluids increase pollutant emission levels, particularly hydrocarbon emission levels.

Nor are conventional piston rings in total circumferential contact with the walls of a cylinder. Instead, there is an open-end clearance between the piston ring and the cylinder wall that results in the undesirable escape of fluids from the cylinder. Fluids in the crevice may bypass the ring and escape, to be replaced by additional fluids, reducing operational efficiency and increasing undesired pollutant emission.

To reduce the emission of pollutants it is known to position a piston ring near the top of a piston such that an upper surface of the piston ring is exposed to combustion gases. The piston ring includes two legs defining a channel, each leg being received in a groove of the piston. Such prior art piston rings include an intrinsic radial tension intended to force the piston ring into greater contact with the cylinder wall. In fact, it has been taught that the use of a ring without an intrinsic radial tension, a so-called dead ring, will not work correctly in such an orientation. Besides teaching the use of a piston ring with an intrinsic tension, the prior art also teaches that piston rings with an intrinsic tension should include a controllably imbalanced or non-symmetrical cross-section with non-symmetrical grooves to encourage torsional twist.

There are several problems with a piston ring having intrinsic loading and a non-symmetrical cross-section. Intrinsic loading continuously places stresses upon the piston ring. Failure results unless piston rings of a substantial size are used. The continuous loading also favors damaging wear to the ring and to the cylinder wall. Further, the use of torsional twist places only a small portion of the piston ring in facial contact with the combustion wall and the walls of the piston ring grooves, facilitating additional damaging wear to the ring, the walls of the piston ring grooves, and to the cylinder wall.

SUMMARY OF THE INVENTION

The present invention relates to a piston assembly with a one-piece, symmetrical, annular top land type piston ring, having very little if any intrinsic radial tension, that is adapted to be received in mating grooves of a piston.

According to the present invention, an inventive piston assembly includes an annular cylinder having an inner cylinder wall defining a bore. An annular piston is reciprocalable along a longitudinally extending axis within the bore of the cylinder. The piston includes two grooves that define the angled walls of a generally keystone wedge. In a preferred embodiment, the wedge has the features of an isosceles trapezpoid, wherein the angled walls share a common length and angle and an outer wall of the wedge is parallel to the longitudinal axis.

A single strip of metal is formed into a one-piece split annular top land type piston ring that is adapted to be received within the grooves of the piston to provide sealing engagement between the piston and the cylinder wall. The piston and piston ring are mated so that only a small crevice is defined between them, reducing the emission of pollutants during operation in an internal combustion engine.

The ring has a symmetrical cross-section, a line of symmetry defined along a radial axis perpendicular to the longitudinal axis and equally spaced between a longitudinally upper surface and a longitudinally lower surface. The piston ring includes a central body, with an upper leg and a lower leg extending radially inwardly from the central body and defining a channel between them that is adapted to receive the wedge. A lower surface of the upper leg extends radially inwardly and longitudinally upwardly from the central body, and an upper surface of the lower leg extends radially inwardly and longitudinally downwardly from the central body.

The piston ring is a so-called dead ring that has very little if any intrinsic radial tension. Such a piston ring requires only a small-cross section, typically having a longitudinal thickness between 3 and 4 mm. A smaller cross-section promotes improved heat transfer, and having less reciprocating mass, also increases assembly life and operational efficiency. The inventive piston ring is inexpensive to make and materials such as high strength steel or low inertia aluminum materials are preferably used.

The inventive assembly does not have any of the leakage problems commonly associated with piston rings lacking an intrinsic radial tension. Instead the shape of the piston ring and the wedge of the piston provide a smooth sliding movement between the mating components as a dynamic force component is created in the radial direction in response to piston reciprocation along the longitudinal axis of the cylinder.

The extent of the dynamic force component in the radial direction is related to the angle of the lower wall of the upper leg, the upper wall of the lower leg, and the mating walls of the grooves. Preferably, the indicated surfaces and walls have a common angle relative to the radial axis, and more preferably, the common angle is between fifteen (15) and thirty (30) degrees.

A balanced or symmetrical cross-section for both the wedge and the mating piston ring is important to the proper operation of the assembly. Torsional twist is not wanted between the piston and the piston ring since torsional twist may interfere with the urging of the central body of the piston ring toward the cylinder wall in response to the radial force component. Torsional twist is also undesirable because of the resulting reduced area of contact between the piston ring and mating components, increasing damaging wear.

In one embodiment of the present invention, the central body includes a convex radially outer periphery. In a second embodiment, the radially outer periphery includes two radially outwardly extending legs adapted to contact the cylinder wall, wherein a channel is defined between them. The legs are shaped to provide sufficient strength against the sliding stress exerted against the legs by the cylinder wall. The use of two points of contact further reduces the tendency for the piston ring to undergo torsional twist.

An assembly made according to the present invention is easily adapted for use in a large number of applications, including internal combustion engines and compressors.

BRIEF DESCRIPTION OF THE DRAWINGS

The features and inventive aspects of the present invention will become more apparent upon reading the following detailed description, claims, and drawings, of which the following is a brief description:

DETAILED DISCLOSURE OF PREFERRED EMBODIMENTS

Figure 1:
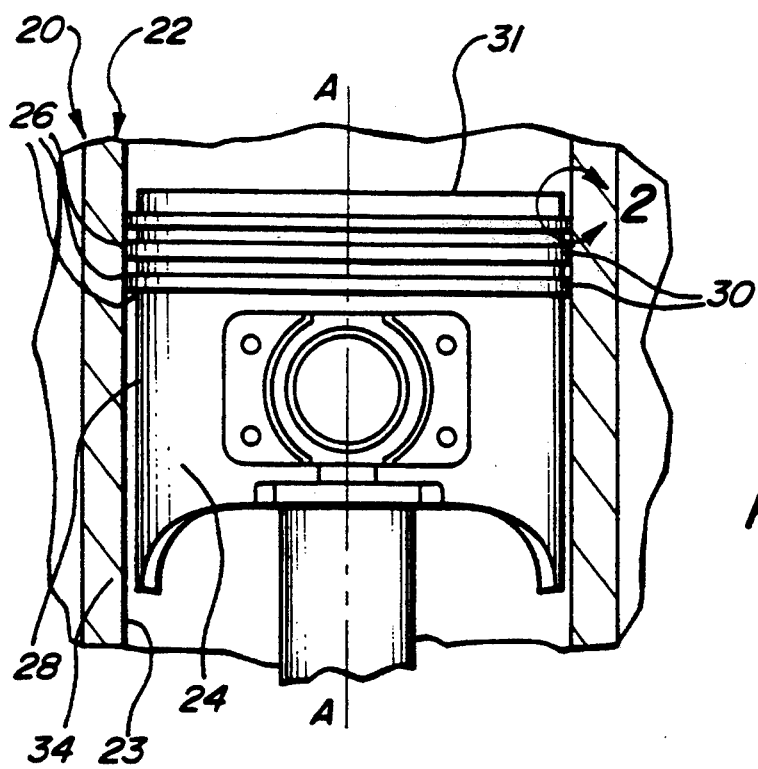
FIG. 1 is a partial cross-section of a prior art piston and cylinder assembly.

A prior art assembly 20 is illustrated in FIG. 1 that includes a cylinder 22 having an inner peripheral surface or cylinder wall 23 defining a bore. An annular piston 24 is reciprocalable along a longitudinally extending axis A—A within the bore of the cylinder 22. Piston 24 includes a plurality of annular grooves 26 about a radially outer peripheral surface 28. A one piece annular piston ring or sealing member 30 is mounted within each of grooves 26 to provide sealing engagement between outer peripheral surface 28 of piston 24 and cylinder wall 23.

Figure 2:
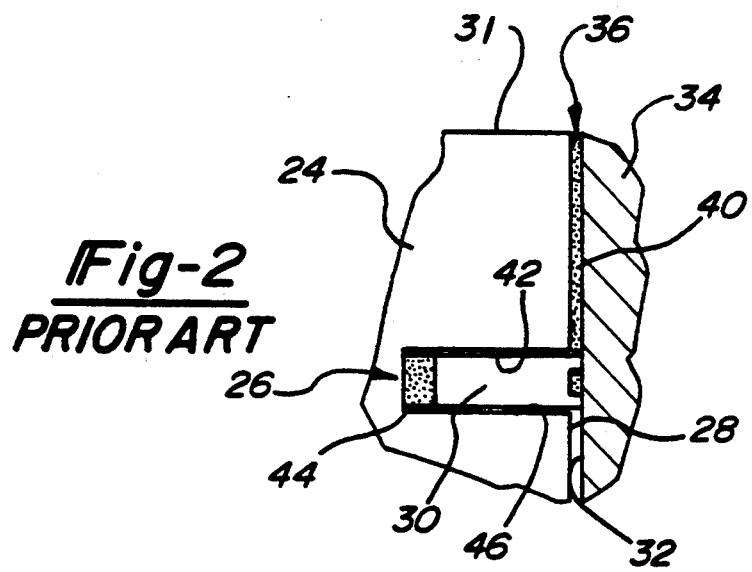
FIG. 2 is an enlarged cross-section shown by circle 2—2 in FIG. 1, illustrating a crevice between the piston and cylinder with trapped combustion gases.
Figure 3:
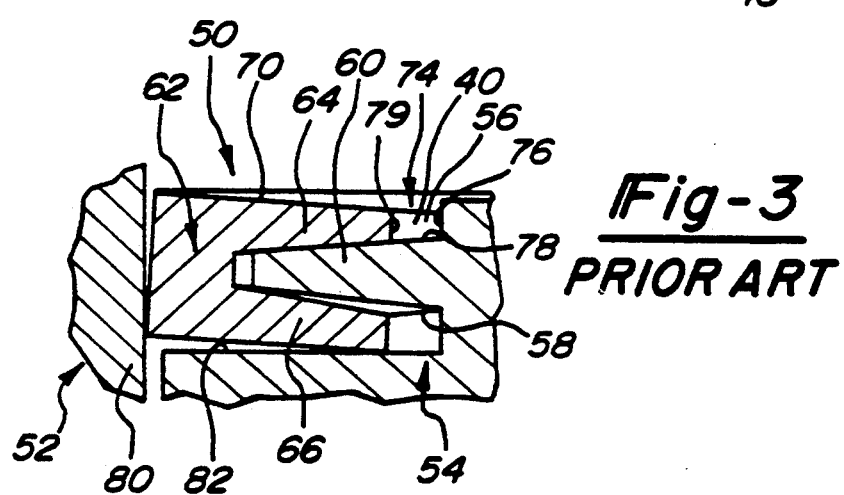
FIG. 3 is a cross-sectional view showing a prior art ring with an upper surface exposed to combustion gases, the piston ring mounted on a piston and the piston positioned within a cylinder.

A portion of prior art assembly 20 is enlarged in FIG. 2. A crevice 36 is defined between outer peripheral surface 28 of piston 24 and the relatively cool inner peripheral surface 32 of cylinder wall 34, and between the top piston ring 30 and an upper surface 31 of the piston 24. In operation, piston 24 compresses combustion fluids 40 such as gases within cylinder 22. In an internal combustion engine, fluids 40 are ignited, and expand, forcing the piston away from the point of ignition. In prior art assembly 20, however, not all of the combustion fluids 40 are ignited. Instead, some of the combustion fluids 40 are trapped within crevice 36. The trapping of fluids 40 within crevice 36 lowers combustion efficiency because the trapped fluids do not ignite. Further, when exhausted from assembly 20, the trapped fluids increase pollutant emission levels, particularly hydrocarbon emission levels. The levels of pollutant emissions are related to the size of crevice 36.

Nor is a piston ring 30 in total circumferential contact with cylinder wall 34 or with walls 42, 44, and 46 of groove 26. Instead, there is often an open-end clearance between piston ring 30 and cylinder wall 23 that results in the undesirable escape of combustion fluids 40 from cylinder 22. Fluids 40 in crevice 36 may bypass ring 30 and escape, to be replaced by additional fluids 40, reducing operational efficiency and increasing undesired pollutant emission.

To reduce the emission of pollutants, a prior art assembly 50 is known that includes a cylinder 52 with an annular piston 54 reciprocalable within the cylinder. Piston 54 includes two angled grooves 56 and 58 that define a generally keystone shaped land or wedge 60. A piston ring 62 includes two legs 64 and 66 that define an eccentric channel or rabbet 68. Leg 64 of ring 62 is received within groove 56 and leg 66 of ring 62 is received within groove 58.

The placement of ring 62 on piston 54 permits an upper surface 70 of leg 64 to be exposed to combustion fluids 40. Therefore, unlike prior art assembly 20, fluids 40 are trapped in a crevice 74 defined between a radially outer wall 76 and a longitudinally lower wall 78 of groove 56 and a radially inner wall 79 of leg 64.

Prior art assembly 50 has several drawbacks. Piston ring 62 includes an intrinsic radial tension intended to force the piston ring 62 into greater contact with a cylinder wall 80 of cylinder 52. Intrinsic loading continuously places stress upon the piston ring and upon the cylinder. Therefore, the piston ring 62 will fail unless it is of sufficient size and material to provide the necessary strength. Yet, a smaller piston ring cross-section is desirable because such a cross-section provides improved heat transfer and less reciprocating mass. The continuous loading also favors damaging wear to the ring and to the cylinder wall.

Despite these disadvantages, the prior art teaches that the use of a ring without an intrinsic radial tension, a so-called dead ring, will not work correctly in assembly 50. Supposedly, the use of a dead ring design requires gas build up in cylinder 22 and behind ring 62 to seat ring 62 against lower wall 78 of groove 56 or a lower wall 82 of groove 58 and cylinder wall 80. Consequent leakage occurs between ring 62 and cylinder wall 80 during the time that the pressure is building up. Fluttering resulting from changing pressures during the strokes of the piston supposedly causes piston ring failure.

Besides teaching that piston ring 62 should have an intrinsic tension, the prior art also teaches that piston ring 62 should include a controllably imbalanced or non symmetrical cross section with non-symmetrical grooves to encourage torsional twist of the piston ring. Therefore, leg 64 has a different thickness than does leg 66 of ring 62. In addition, legs 64 and 66 of ring 62, and grooves 56 and 58 of piston 54 are configured to promote torsional twisting. For example, the angle of slope of each of legs 64 and 66, and grooves 56 and 58, may be varied with respect to one another. The use of a controlled torsional twist places only a small portion of the piston ring 62 in facial contact with the combustion wall 80 and with a corresponding wall 78 of groove 56 or wall 82 of groove 58. Thus, facilitating torsional twist results in additional damaging wear to ring 62, the walls of grooves 56 and 58, and to cylinder 52.

Figure 4:
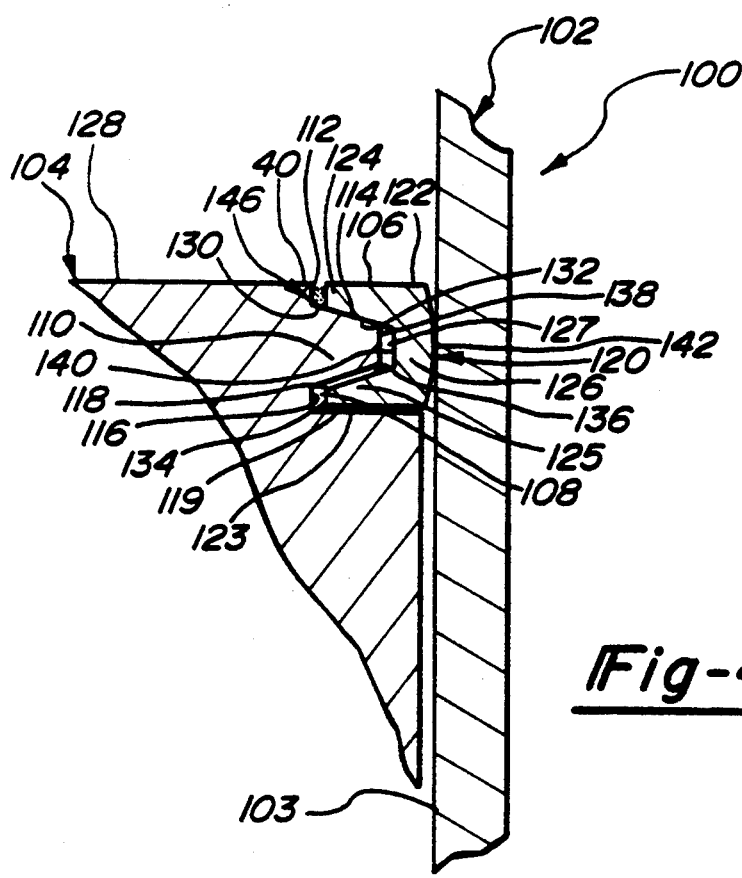
FIG. 4 is a cross-sectional view of a first embodiment of the present invention showing a piston ring with an upper surface exposed to combustion gases, the piston ring mounted on a piston and the piston positioned within a cylinder.

A first embodiment of an inventive assembly 100 is illustrated in FIG. 4. Assembly 100 includes an annular cylinder 102 having an inner peripheral surface or cylinder wall 103 defining a bore. An annular piston 104 is reciprocalable along longitudinally extending axis A—A (shown in FIG. 1) within the bore of cylinder 102. Piston 104 includes two angled grooves 106 and 108 that define a generally keystone shaped land or wedge 110. Upper groove 106 has a radially outer wall 112 extending generally parallel to axis A—A, and an angled lower wall 114. Wall 114 extends longitudinally downwardly and radially outwardly. Lower groove 108 has a radially outer wall 116 generally parallel to axis A—A, an angled upper wall 118, and a radially lower wall 119 generally perpendicular to axis A—A. Wall 118 extends longitudinally upwardly and radially outwardly. Preferably, wedge 110 has the features of an isosceles trapezoid wherein the walls 114 and 118 share a common length and angle.

A single strip of metal is formed or extruded into a one-piece split annular top land type piston ring or sealing member 120. Piston ring 120 is adapted to be received within grooves 106 and 108 to provide sealing engagement between piston 104 and cylinder wall 103. Ring 120 has a symmetrical cross-section, a line of symmetry defined along a radial axis perpendicular to the axis A—A and equally spaced between a longitudinally upper surface 122 and a longitudinally lower surface 123. Two legs 124 and 125 extend radially inwardly from a central body 126 to define a channel 127 receiving wedge 110. Upper surface 122 is adapted to be exposed to combustion fluids 40. When piston ring 120 is installed, upper surface 122 is preferably parallel and generally flush with an upper surface 128 of piston 104. Besides comprising a portion of upper surface 122, upper leg 124 has a radially inner surface 130 that is adapted to be parallel to outer wall 112 of groove 106. Upper leg 124 also has an angled lower surface 132 that is adapted to be parallel to lower wall 114 of groove 106. Lower surface 132 extends radially inwardly and longitudinally upwardly of central body 126. Besides comprising a portion of lower surface 123, lower leg 125 has a radially inner surface 134 adapted to be parallel to outer wall 116 of groove 108, and an angled upper surface 136 adapted to be parallel to upper wall 118. Upper surface 136 extends radially and longitudinally downwardly inwardly of central body 126. Lower surface 123 is adapted to be parallel to wall 119.

Preferably, surfaces 132 and 136 have the same dimensions, including a common angle with respect to the line of symmetry. A radially outer surface 138 of wedge 110 is adapted to correspond to a mating surface 140 of piston ring 142. In the illustrated embodiment, the surfaces extend along an axis parallel to axis A—A. However, the length of surface 138 is typically less than the length of surface 140. Similarly, the length of surface 134 is less than the length of wall 116. Therefore, some longitudinally axial movement of piston ring 120 relative to wedge 110, is permitted. In the illustrated embodiment, surfaces 138 and 140 are both parallel to the reciprocalable movement of piston 104. Piston ring 120 also includes a barrel-shaped or convex radially outer periphery 142 that is adapted to facially contact cylinder wall 103.

Unlike prior art assembly 20 of FIG. 1, fluids 40 are trapped in a crevice 146 defined between outer wall 112 of groove 106 and outer surface 130 of leg 124, and lower wall 114 of groove 106 and upper surface 128 of piston 104. Thus, fewer pollutants are trapped within assembly 100. Further, fluids 40 trapped within crevice 146 are more likely to ignite because the crevice does not include a relatively cool cylinder wall that inhibits combustion, further increasing efficiency and reducing the emission of pollutants such as hydrocarbons.

Piston ring 120 of assembly 100 is a so-called dead ring that has very little if any intrinsic radial tension. This provides several advantages. First, piston ring 120 requires only a small cross-section, typically having a longitudinal thickness between 3 and 4 mm. A smaller cross section is possible because the structure of the piston is not required to support a continuous radial tension without failure. A smaller piston ring, with less material, promotes improved heat transfer from the piston ring, increasing piston ring life. Further, having less reciprocating matter increases assembly life and operational efficiency. In addition, rings with little or no intrinsic loads are less expensive to make. Nor is piston ring 120 prone to breakage as piston 104 reciprocates in cylinder 102 because of the availability of low cost, high strength steel and low inertia aluminum materials. Such materials are preferably used to make piston ring 120.

Assembly 100 does not have any of the leakage problems commonly associated with piston rings lacking an intrinsic radial tension, wherein gas pressure buildup is required to seat the piston ring against the cylinder wall. Instead, the shape of the piston ring 120 and wedge 110 provides a dynamic force component in the radial direction as piston 104 reciprocates within cylinder 102. For example, as illustrated in FIG. 4, when piston 104 moves upward, wall 114 of groove 106 comes into facial contact with lower surface 132 of leg 124. The angled relationship between wall 114 and surface 132 results in a force component being exerted in a radially outward direction and a smooth sliding movement between wall 114 and surface 132 which urges periphery 142 radially outwardly and into contact with wall 144. Gas buildup merely aids in the urging, but is not required.

Wall 119 of groove 108 and lower surface 123 are configured to allow the desired movement of leg 124 relative to wedge 110. In the illustrated embodiment, wall 119 and lower surface 123 come into contact when periphery 142 contacts wall 144. Thus, additional surface area is provided to carry load exerted longitudinally downwardly between piston 104 and piston ring 120, reducing undesirable wear to each element.

To provide a sufficient radial force component, walls 114 and 118, and surfaces 132 and 136 preferably have an angle between fifteen (15) and thirty (30) degrees relative to a radially extending axis perpendicular to axis A—A. As discussed above, the walls 114 and 118 preferably have a common angle so that wedge 110 has the general shape of an isosceles trapezoid. A balanced or symmetrical cross-section for both land 110 and mating piston ring 120 is very Important to the proper operation of assembly 100. Torsional twist is not wanted between piston 104 and piston ring 120 since the torsional twist may Interfere with the urging of periphery 142 against cylinder wall 103 in response to the radial force component. Torsional twist is also undesirable because of the resulting reduced area of contact between piston ring 120, and both cylinder 102 and piston 104, increasing damaging wear.

Figure 5:
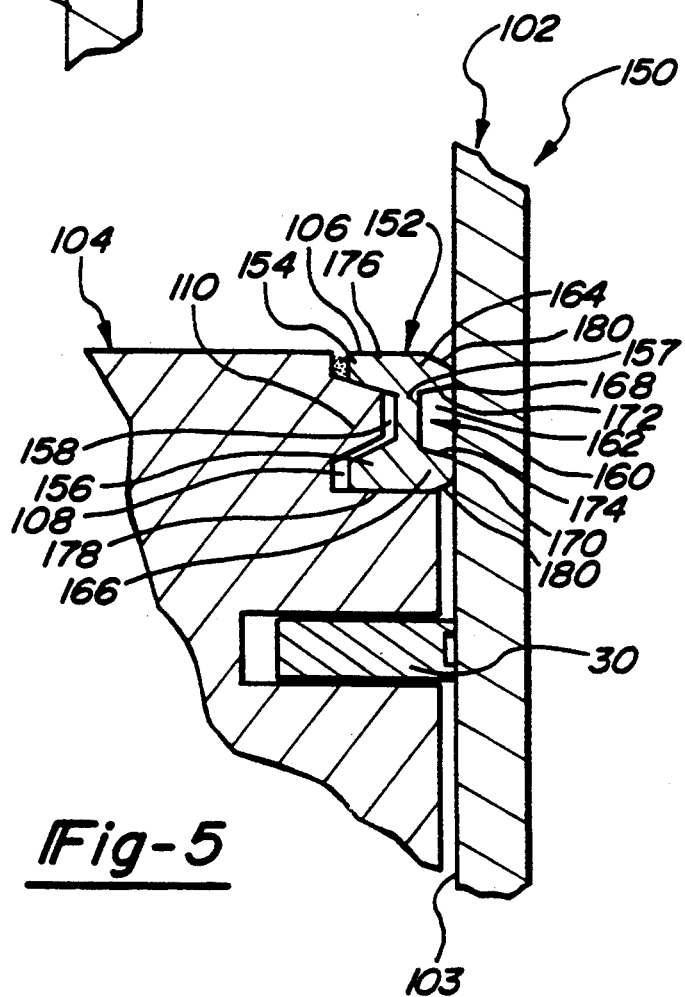
FIG. 5 is a cross-sectional view of a second embodiment of the present invention showing two piston rings including an upper piston ring with an upper surface exposed to combustion gases that are mounted upon a piston and the piston positioned within a cylinder.

A second embodiment of an inventive piston cylinder assembly 150 is illustrated in FIG. 5. Assembly 150 includes an annular cylinder 102 having an inner cylinder wall 103 defining a bore. An annular piston 104 is reciprocable along a longitudinal axis A—A (shown in FIG. 1). As with assembly 100, piston 104 includes two angled grooves 106 and 108 that define a generally keystone shaped land or wedge 110. A one-piece piston ring 152 is adapted to be received within grooves 106 and 108. Ring 152 has a symmetrical cross-section with two legs 154 and 156 extending from a central body 157 and defining a channel 158 receiving wedge 110. Piston ring 152 and 104 work in a manner similar to assembly 100. However, piston ring 152 has a different radially outer periphery 160 when compared to the convex periphery 142 of assembly 100. Piston ring 152 is a so-called dead weight ring with little or no intrinsic radial tension. Therefore, less piston ring material is required. As noted above, a smaller piston ring cross-section is desirable because such a cross-section results in improved heat transfer and less reciprocating mass.

To take advantage of the need for less material, periphery 160 includes a channel 162 defined between two legs 164 and 166, legs 164 and 166 extending radially outwardly from central body 157. Identically dimensioned legs 164 and 166 provide two separate points 168 and 170 of contact between piston ring 152 and cylinder wall 103. Points of contact 168 and 170 reduce the tendency for piston ring 152 to undergo torsional twist that would lessen the dynamic force component in the outward radial direction as piston 104 reciprocates along axis A—A (shown in FIG. 1) within cylinder 102. Legs 164 and 166 are shaped to have more material at an inner radial location compared with an outer radial location to provide sufficient strength against the sliding stresses exerted against legs 164 and 166 by cylinder wall 103 while minimizing material requirements. Therefore, leg 164 includes an longitudinally upwardly and radially outwardly extending angled wall 172. Leg 166 includes a longitudinally downwardly radially outwardly extending angled wall 174. An upper surface 176 and a lower surface 178 of piston ring 152 both include a chamfer 180 disposed adjacent points of contact 168 and 170, respectively, to further minimize material.

Finally, assembly 150 includes a conventional piston ring 30. While a specialized piston ring 152 is required to improve combustion efficiency and reduce pollutant emission, such rings are only required at the top of the piston. Therefore, conventional piston rings may still be used.

Preferred embodiments of the present invention have been described. Variations and modifications may be employed without departing from the scope of the present invention. Accordingly, the following claims should be studied to learn the true scope of the present invention.

What is claimed is:

1. An annular piston ring adapted to be received within a piston, the piston reciprocable along a longitudinally extending axis within a cylinder having an inner cylinder wall defining a bore that receives the piston, the piston ring comprising:
a single strip of metal formed into a split annular ring with little or no intrinsic load, having a symmetrical cross-section, a line of symmetry defined along a radial axis perpendicular to the longitudinal axis and equally spaced between a longitudinally upper surface and a longitudinally lower surface of said ring, said piston ring including a central body, with an upper leg and a lower leg extending radially inwardly from said central body and defining a channel between them, a lower surface of said upper leg extending radially inwardly and longitudinally upwardly from said central body, and an upper surface of said lower leg extending radially inwardly and longitudinally downwardly from said central body, said lower wall of said upper leg and said upper wall of said lower leg having a common angle relative no said radial axis said common angle being between fifteen and thirty degrees.

2. A piston ring as recited in claim 1, wherein an outer radial periphery of said central body includes an upper edge and a lower edge, a continuous convex surface extending from said upper edge to said lower edge to provide a line of contact between said periphery and the inner cylinder wall.

3. A piston ring as recited in claim 1, wherein a radially outer periphery of said central body includes two radially inwardly extending legs, a channel defined between said radially outwardly extending legs, each of said radially outwardly extending legs adapted to contact the cylinder wall.

4. A piston ring as recited in claim 1, wherein said piston ring has a longitudinal thickness between 3 and 4 mm.

5. An assembly comprising:
a cylinder having an inner cylinder wall defining a bore;
an annular piston reciprocable along a longitudinal axis within said bore and adapted to compress fluids, said piston including two angled grooves that define a generally keystone shaped wedge, an upper groove having a lower wall extending longitudinally downwardly and radially outwardly and a lower groove having an upper wall extending longitudinally upwardly and radially outwardly; and
a single strip of metal formed into a split annular piston ring with little or no intrinsic load, having a symmetrical cross-section, a line of symmetry defined along a radial axis perpendicular to the longitudinal axis and equally spaced between a longitudinally upper surface and a longitudinally lower surface of said ring, said piston ring including a central body, an upper leg and a lower leg extending radially inwardly from said central body and defining a channel between them, said upper leg received in said upper groove of said piston, said lower leg received in said lower groove of said piston, and said wedge received in said channel of said piston ring, a lower surface of said upper leg extending radially inwardly and longitudinally upwardly from said central body, and an upper surface of said lower leg extending radially inwardly and longitudinally downwardly from said central body.

6. An assembly as recited in claim 5, wherein said lower wall of said upper leg and said upper wall of said lower leg share a common angle relative to said radial axis.

7. An assembly as recited in claim 6, wherein said upper groove and said lower groove of said piston share said common angle.

8. An assembly as recited in claim 7, said common angle being between fifteen and thirty degrees.

9. An assembly as recited in claim 5, wherein a radially directed dynamic force component created as said piston reciprocates in said cylinder seating an outer radial periphery of said central body of said piston ring against said cylinder wall.

10. An assembly as recited in claim 9, wherein said outer radial periphery of said central body of said piston ring is convex.

11. An assembly as recited in claim 9, wherein said outer periphery of said central body of said ring includes a channel defined between two radially outwardly extending legs, each of said radially outwardly extending legs adapted to contact said cylinder wall.

12. An assembly as recited in claim 5, wherein said wedge is an isosceles trapezoid, said walls sharing a common length and angle, and a radially outer surface of said ledge extending along an axis parallel to said longitudinal axis.

13. An assembly as recited in claim 5, wherein said longitudinally upper surface of said piston ring is adapted to be exposed to said fluids.

14. An assembly as recited in claim 13, wherein said upper surface of said piston ring is generally flush with an upper surface of said piston.

15. An assembly as recited in claim 13, wherein said upper leg of said ring includes a radially inner surface, and said upper groove of said piston includes an outer wall, a portion of said fluids trapped a crevice defined between said outer wall of said upper groove and said radially inner surface of said upper leg and between said lower wall of said upper groove and said upper surface of said piston.

16. An assembly comprising:
  a cylinder having an inner cylinder wall defining a bore;
  an annular piston reciprocalable along a longitudinal axis within said bore and adapted to compress fluids, said piston including two angled grooves that define a wedge, an upper groove having a lower wall extending longitudinally downwardly and radially outwardly and a lower groove having an upper wall extending longitudinally upwardly and radially outwardly, said wedge being generally an isosceles trapezoid with said walls sharing a common length and angle; and
  a single strip of metal formed into a split annular piston ring having little or no intrinsic load, having a symmetrical cross-section, a line of symmetry defined along a radial axis perpendicular to the longitudinal axis and equally spaced between a longitudinally upper surface and a longitudinally lower surface of said ring, said piston ring including a central body, an upper leg and a lower leg extending radially inwardly from said central body and defining a channel between them, said upper leg received in said upper groove of said piston, said lower leg received in said lower groove of said piston, and said wedge received in said channel of said piston ring, said upper surface of said ring generally flush with an upper surface of said piston, a lower surface of said upper leg extending radially inwardly and longitudinally upwardly from said central body, and an upper surface of said lower leg extending radially inwardly and longitudinally downwardly from said central body, wherein said lower wall of said upper leg, said upper wall of said lower leg, said upper groove of said piston, and said lower groove of said piston share a common angle, a radially directed dynamic force component created as said piston reciprocates in said cylinder seating an outer radial periphery of said central body of said piston ring against said cylinder wall.

17. An assembly as recited in claim 16, wherein said common angle is between 15 and 30 degrees.

* * * * *

UNITED STATES PATENT AND TRADEMARK OFFICE
CERTIFICATE OF CORRECTION

PATENT NO. : 5,450,783

DATED : September 19, 1995

INVENTOR(S) : J. Dudley Binford

It is certified that error appears in the above-identified patent and that said Letters Patent is hereby corrected as shown below:

Column 8, line 9, "no" is deleted and --to-- is inserted.

Column 8, line 9, --,-- is inserted after "axis".

Signed and Sealed this

Fifth Day of December, 1995

Attest:

BRUCE LEHMAN

Attesting Officer

Commissioner of Patents and Trademarks